US008166511B2

(12) United States Patent
Griggs (10) Patent No.: US 8,166,511 B2
(45) Date of Patent: Apr. 24, 2012

(54) MECHANISM FOR DISTRIBUTING CONTENT DATA

(75) Inventor: Theodore L. Griggs, Woodside, CA (US)

(73) Assignee: Resource Consortium Limited (VG)

( * ) Notice: Subject to any disclaimer, the term of this patent is extended or adjusted under 35 U.S.C. 154(b) by 7 days.

(21) Appl. No.: 11/584,399

(22) Filed: Oct. 19, 2006

(65) Prior Publication Data

US 2007/0174873 A1  Jul. 26, 2007

Related U.S. Application Data

(62) Division of application No. 09/909,676, filed on Jul. 19, 2001, now abandoned.

(60) Provisional application No. 60/219,857, filed on Jul. 20, 2000, provisional application No. 60/233,581, filed on Sep. 19, 2000.

(51) Int. Cl.
*H04N 7/173* (2006.01)

(52) U.S. Cl. .......................................... 725/114; 725/46

(58) Field of Classification Search .............. 725/46–47, 725/109–110, 112, 115, 118, 133, 141, 144, 725/148, 153
See application file for complete search history.

(56) References Cited

U.S. PATENT DOCUMENTS

| 3,341,833 | A | 9/1967 | Jones |
| 3,440,427 | A | 4/1969 | Kammer |
| 3,493,674 | A | 2/1970 | Houghton |
| 3,645,539 | A | 2/1972 | Jenkins |
| 3,682,363 | A | 8/1972 | Hull |
| 3,833,757 | A | 9/1974 | Kirk, Jr. et al. |
| 3,855,426 | A | 12/1974 | Bouwhuis |
| 3,891,792 | A | 6/1975 | Kimura |
| 3,996,583 | A | 12/1976 | Hutt et al. |
| 4,016,361 | A | 4/1977 | Pandey et al. |
| 4,026,555 | A | 5/1977 | Kirschner et al. |
| 4,052,719 | A | 10/1977 | Hutt et al. |
| 4,096,524 | A | 6/1978 | Scott et al. |
| 4,134,127 | A | 1/1979 | Campioni et al. |
| 4,139,860 | A | 2/1979 | Micic et al. |
| 4,161,728 | A | 7/1979 | Insam et al. |
| 4,170,782 | A | 10/1979 | Miller |
| 4,203,130 | A | 5/1980 | Doumit et al. |

(Continued)

FOREIGN PATENT DOCUMENTS

EP  0 041 121 A1  12/1981

(Continued)

OTHER PUBLICATIONS

U.S. Appl. No. 11/503,818, filed May 14, 2003, Griggs.

(Continued)

*Primary Examiner* — Ngoc Vu
(74) *Attorney, Agent, or Firm* — Carlineo, Spicer & Kee, LLC (57) ABSTRACT

The current invention provides a system for distributing content data to user locations. The content data preferably includes digital video data that is available on demand from a requesting location. A system server stores user accounts and generated customized program schedules for the user account based on user criteria which includes user preferences. Authorized users access their accounts to modify user criteria and to select program transmissions. Preferably, a computer and a television set receive program transmissions from a system network, wherein the computer provides a logical interface between the television set and content data transmitted over the system network.

24 Claims, 9 Drawing Sheets

U.S. PATENT DOCUMENTS

| | | |
|---|---|---|
| 4,205,343 A | 5/1980 | Barrett et al. |
| 4,218,698 A | 8/1980 | Bart et al. |
| 4,222,069 A | 9/1980 | Groetschel et al. |
| 4,231,031 A | 10/1980 | Crowther et al. |
| 4,233,628 A | 11/1980 | Ciciora |
| 4,249,211 A | 2/1981 | Baba et al. |
| 4,261,006 A | 4/1981 | Weintraub et al. |
| 4,264,924 A | 4/1981 | Freeman |
| 4,270,145 A | 5/1981 | Farina et al. |
| 4,283,735 A | 8/1981 | Jagger |
| 4,288,809 A | 9/1981 | Yabe et al. |
| 4,319,286 A | 3/1982 | Hanpachern |
| 4,325,080 A | 4/1982 | Satoh et al. |
| 4,329,684 A | 5/1982 | Monteath et al. |
| 4,337,480 A | 6/1982 | Bourassin et al. |
| 4,337,483 A | 6/1982 | Guillou et al. |
| 4,344,090 A | 8/1982 | Belisomi et al. |
| 4,390,901 A | 6/1983 | Keiser et al. |
| 4,408,309 A | 10/1983 | Kiesling et al. |
| 4,412,244 A | 10/1983 | Shanley, II |
| 4,412,281 A | 10/1983 | Works |
| 4,420,769 A | 12/1983 | Novak |
| 4,425,581 A | 1/1984 | Schweppe et al. |
| 4,430,676 A | 2/1984 | Johnson |
| 4,445,195 A | 4/1984 | Yamamoto et al. |
| 4,449,249 A | 5/1984 | Price |
| 4,456,925 A | 6/1984 | Skerlos et al. |
| 4,477,830 A | 10/1984 | Lindman et al. |
| 4,488,179 A | 12/1984 | Kruger et al. |
| 4,495,654 A | 1/1985 | Deiss |
| 4,496,171 A | 1/1985 | Cherry |
| 4,496,976 A | 1/1985 | Swanson et al. |
| 4,521,914 A | 6/1985 | Petrovic et al. |
| 4,547,804 A | 10/1985 | Greenberg |
| 4,566,034 A | 1/1986 | Harger et al. |
| 4,577,240 A | 3/1986 | Hedberg et al. |
| 4,595,951 A | 6/1986 | Filliman |
| 4,595,952 A | 6/1986 | Filliman |
| 4,620,229 A | 10/1986 | Amano et al. |
| 4,630,108 A | 12/1986 | Gomersall |
| 4,631,601 A | 12/1986 | Brugliera et al. |
| 4,633,331 A | 12/1986 | McGrady et al. |
| 4,691,351 A | 9/1987 | Hayashi et al. |
| 4,694,490 A | 9/1987 | Harvey et al. |
| 4,706,121 A | 11/1987 | Young |
| 4,707,121 A | 11/1987 | Sawaki et al. |
| 4,734,765 A | 3/1988 | Okada et al. |
| 4,751,578 A | 6/1988 | Reiter et al. |
| 4,768,228 A | 8/1988 | Clupper et al. |
| 4,786,982 A | 11/1988 | Wakahara et al. |
| 4,841,132 A | 6/1989 | Kajitani et al. |
| 4,866,434 A | 9/1989 | Keenan |
| 4,876,670 A | 10/1989 | Nakabayashi et al. |
| 4,891,715 A | 1/1990 | Levy et al. |
| 4,908,707 A | 3/1990 | Kinghorn et al. |
| 4,908,713 A | 3/1990 | Levine |
| 4,949,187 A | 8/1990 | Cohen |
| 4,963,866 A | 10/1990 | Duncan |
| 4,963,994 A | 10/1990 | Levine |
| 4,972,396 A | 11/1990 | Rafner |
| 4,977,455 A | 12/1990 | Young |
| 4,991,033 A | 2/1991 | Takeshita et al. |
| 5,016,273 A | 5/1991 | Hoff |
| 5,021,893 A | 6/1991 | Scheffler |
| 5,038,211 A | 8/1991 | Hallenbeck |
| 5,063,453 A | 11/1991 | Yoshimura et al. |
| 5,119,075 A | 6/1992 | Smith |
| 5,134,499 A | 7/1992 | Sata et al. |
| 5,184,115 A | 2/1993 | Black et al. |
| 5,193,208 A | 3/1993 | Yokota et al. |
| 5,223,924 A | 6/1993 | Strubbe |
| 5,227,934 A | 7/1993 | Vasilescu et al. |
| 5,241,428 A | 8/1993 | Goldwasser et al. |
| 5,291,554 A | 3/1994 | Morales |
| 5,293,357 A | 3/1994 | Hallenbeck |
| 5,307,173 A | 4/1994 | Yuen et al. |
| 5,321,514 A | 6/1994 | Martinez |
| 5,329,320 A | 7/1994 | Yifrach et al. |
| 5,345,430 A | 9/1994 | Moe |
| 5,357,383 A | 10/1994 | Godwin |
| 5,371,551 A | 12/1994 | Logan et al. |
| 5,371,795 A | 12/1994 | Vogel et al. |
| 5,382,983 A | 1/1995 | Kwoh et al. |
| 5,404,505 A | 4/1995 | Levinson |
| 5,438,423 A | 8/1995 | Lynch et al. |
| 5,452,291 A | 9/1995 | Eisenhandler et al. |
| 5,457,583 A | 10/1995 | Kaneko et al. |
| 5,475,835 A | 12/1995 | Hickey |
| 5,479,268 A | 12/1995 | Young et al. |
| 5,485,219 A | 1/1996 | Woo et al. |
| 5,489,894 A | 2/1996 | Murray |
| 5,508,815 A | 4/1996 | Levine |
| 5,515,173 A | 5/1996 | Mankovitz et al. |
| 5,534,911 A | 7/1996 | Levitan |
| 5,555,463 A | 9/1996 | Staron et al. |
| 5,557,422 A | 9/1996 | Nishigaki et al. |
| 5,585,838 A | 12/1996 | Lalwer et al. |
| 5,589,892 A | 12/1996 | Knee et al. |
| 5,619,274 A | 4/1997 | Roop et al. |
| 5,663,757 A | 9/1997 | Morales |
| 5,666,645 A | 9/1997 | Thomas et al. |
| 5,682,206 A | 10/1997 | Wehmeyer et al. |
| 5,701,383 A | 12/1997 | Russo et al. |
| 5,703,795 A | 12/1997 | Mankovitz |
| 5,729,549 A | 3/1998 | Kostreski et al. |
| 5,751,883 A * | 5/1998 | Ottesen et al. ............... 386/27 |
| 5,758,257 A * | 5/1998 | Herz et al. ................... 725/116 |
| 5,781,246 A | 7/1998 | Alten et al. |
| 5,798,785 A | 8/1998 | Hendricks et al. |
| 5,818,441 A | 10/1998 | Throckmorten et al. |
| 5,870,150 A | 2/1999 | Yuen |
| 5,987,213 A | 11/1999 | Mankovitz et al. |
| 5,988,078 A | 11/1999 | Levine |
| 6,029,045 A | 2/2000 | Picco et al. |
| 6,029,195 A | 2/2000 | Herz |
| 6,037,933 A | 3/2000 | Blonstein et al. |
| 6,052,145 A | 4/2000 | Macrae et al. |
| 6,100,884 A | 8/2000 | Tomita et al. |
| 6,177,931 B1 | 1/2001 | Alexander et al. |
| 6,219,839 B1 | 4/2001 | Sampsell |
| 6,255,961 B1 | 7/2001 | Van Ryzin et al. |
| 6,263,503 B1 | 7/2001 | Margulis |
| 6,305,018 B1 | 10/2001 | Usui et al. |
| 6,323,911 B1 | 11/2001 | Schein et al. |
| 6,374,406 B2 * | 4/2002 | Hirata ........................ 725/132 |
| 6,388,714 B1 | 5/2002 | Schein et al. |
| 6,434,747 B1 * | 8/2002 | Khoo et al. ................... 725/46 |
| 6,452,923 B1 | 9/2002 | Gerszberg et al. |
| 6,466,971 B1 | 10/2002 | Humpleman et al. |
| 6,469,753 B1 | 10/2002 | Klosterman et al. |
| 6,490,443 B1 | 12/2002 | Freeny, Jr. |
| 6,505,348 B1 | 1/2003 | Knowles et al. |
| 6,510,152 B1 | 1/2003 | Gerszberg et al. |
| 6,594,688 B2 | 7/2003 | Ludwig et al. |
| 6,611,654 B1 * | 8/2003 | Shteyn ......................... 386/83 |
| 6,637,029 B1 | 10/2003 | Maissel et al. |
| 6,678,740 B1 * | 1/2004 | Rakib et al. ................. 709/247 |
| 6,678,891 B1 | 1/2004 | Wilcox et al. |
| 6,684,399 B1 | 1/2004 | Grooters |
| 6,694,352 B1 | 2/2004 | Omoigui |
| 6,704,028 B2 | 3/2004 | Wugofski |
| 6,721,955 B2 | 4/2004 | Khoo et al. |
| 6,747,591 B1 | 6/2004 | Lilleness et al. |
| 6,756,997 B1 | 6/2004 | Ward, III et al. |
| 6,766,526 B1 | 7/2004 | Ellis |
| 6,774,926 B1 | 8/2004 | Ellis et al. |
| 6,804,705 B2 | 10/2004 | Greco et al. |
| 6,865,746 B1 | 3/2005 | Herrington et al. |
| 6,868,292 B2 | 3/2005 | Ficco et al. |
| 6,898,762 B2 | 5/2005 | Ellis et al. |
| 6,990,677 B1 | 1/2006 | Pietraszak et al. |
| 7,076,734 B2 | 7/2006 | Wolff et al. |
| 7,143,429 B2 * | 11/2006 | Mineyama ................... 725/58 |
| 7,197,713 B2 | 3/2007 | Stern |
| 2002/0046407 A1 * | 4/2002 | Franco ........................ 725/110 |
| 2002/0120932 A1 | 8/2002 | Schwalb |
| 2002/0124253 A1 * | 9/2002 | Eyer et al. .................... 725/34 |

| | | | |
|---|---|---|---|
| 2002/0154157 A1 | 10/2002 | Sherr et al. | |
| 2003/0028887 A1 | 2/2003 | Frouin et al. | |
| 2004/0019908 A1 | 1/2004 | Williams et al. | |
| 2004/0068739 A1 | 4/2004 | Russ et al. | |
| 2005/0076361 A1 | 4/2005 | Choi et al. | |
| 2005/0086687 A1 | 4/2005 | Omoigui | |
| 2005/0160461 A1 | 7/2005 | Baumgartner et al. | |
| 2006/0150214 A1 | 7/2006 | Ramraz et al. | |
| 2007/0101370 A1 | 5/2007 | Calderwood | |
| 2007/0199030 A1 | 8/2007 | Ellis et al. | |
| 2007/0283393 A1 | 12/2007 | Kikinis | |
| 2009/0044226 A1 | 2/2009 | Ellis et al. | |

FOREIGN PATENT DOCUMENTS

| | | |
|---|---|---|
| EP | 0 254 924 A2 | 2/1988 |
| EP | 0254927 | 2/1988 |
| EP | 0 368 313 B1 | 6/1997 |
| EP | 0368313 | 6/1997 |
| EP | 0 924 927 A2 | 6/1999 |
| EP | 1 187 348 A2 | 3/2002 |
| JP | 9-322147 | 12/1997 |
| JP | 2000-115646 | 4/2000 |
| WO | WO-91/07050 | 5/1991 |
| WO | WO-92/08320 | 5/1992 |
| WO | WO-98/26584 | 6/1998 |
| WO | WO-99/35849 | 7/1999 |
| WO | WO-00/08855 A1 | 2/2000 |
| WO | WO-00/11869 | 3/2000 |
| WO | WO-00/30350 | 5/2000 |
| WO | WO-00/36584 | 6/2000 |
| WO | WO-00/52928 | 9/2000 |

OTHER PUBLICATIONS

U.S. Appl. No. 10/490,648, filed Oct. 31, 2000, Griggs.
U.S. Appl. No. 10/461,142, filed Jun. 12, 2003, Griggs.
U.S. Appl. No. 10/846,189, filed May 14, 2003, Griggs.
U.S. Appl. No. 11/589,273, filed Oct. 25, 2006, Griggs.
U.S. Appl. No. 10/000,495, filed Oct. 31, 2000, Griggs.
U.S. Appl. No. 10/846,332, filed May 14, 2003, Griggs.
U.S. Appl. No. 10/846,096, filed Oct. 31, 2000, Griggs.
U.S. Appl. No. 11/949,710, filed Oct. 31, 2000, Griggs.
U.S. Appl. No 11/643,146, filed Dec. 20, 2006, Griggs.

* cited by examiner

MECHANISM FOR DISTRIBUTING CONTENT DATA

RELATED APPLICATION(S)

This patent application is a division of U.S. patent application Ser. No. 09/909,676, filed Jul. 19, 2001, which in turn claims priority under 35 U.S.C. 119(e) of U.S. Provisional Patent Application Ser. No. 60/129,857, filed Jul. 20, 2000 and U.S. Provisional Patent Application Ser. No. 60/233,581 filed Sep. 19, 2000. All three prior applications are hereby incorporated by reference.

FIELD OF THE INVENTION

The present invention relates to architectures and systems for and methods of distributing content to user locations. More specifically, this invention related distributing program transmissions to user locations from a program schedule account.

BACKGROUND OF THE INVENTION

There are numerous media services which provide scheduled programs on a viewing device, such as a television set. There are standard broadcast services which provide channels that can be received by virtually any television tuner through an antenna connector. There are cable services which typically offer packages of preselected channels to the consumers and that required a decoder at the television tuner or on the cable line at an external location. Cable services continuously broadcast scheduled programming through a preselected set of channels which are received through a cable connector on a television set. There are also a number of pay-per-view services which allow costumers to receive non-scheduled one time program transmissions through the cable network. Other available services include satellite programming which allow consumers to select on demand pay-per view-programs from a set of available programs.

Each of these programming services require that consumers monitor program availabilities to determine if a desired program is offered. None of the current program services provide for programming that is tailored to individual consumers needs. Further, none of the current services provide the flexibility for consumers to quickly change the scope services and/or program availabilities.

SUMMARY OF THE INVENTION

The current invention provides for the distribution of content data. The current invention preferably allows consumers to readily change the scope of services provided and monitor programs which may be of interest based on individual consumer needs.

Accordingly, the invention is directed to an architecture and system for and a method of distributing content data to user locations. Preferably, the content data comprises program data from one or more content providers. The programs can be scheduled programs and/or stored video programs. The content data is preferably distributed to user locations as data transmissions which can be played or viewed at user locations. The program transmissions are preferably transmitted to the user locations by a system network or, alternately, can be selectively broadcast by wireless means to user locations.

The data transmissions preferably comprise digital video data, wherein programs are transmitted to the user locations through a high speed network and played on receiving/display devices with sound and display capabilities. Preferably, a receiving/display device is a digital device configured for receiving digital video data and for viewing a video program downloaded from the network to a memory device. The digital device can be any such conventional device and can include, but is not limited to, a personal computer, PDA, a web enabled television set or a web appliance. In a preferred embodiment of the instant invention, the receiving device comprises a personal computer and a television set. A personal computer preferably has a video card which provides a logical interface between the television set and digital video data transmitted distributed as video programs over the system network.

The preferred system of the instant invention comprises a network for customized cataloging of content data availabilities into program schedules. A system network comprises the internet, a private pay-to-use network, a local network, a cable network, a commercial broadcast network or any combination thereof. A system server is coupled to the system network and stores a program schedule and user codes for each user account on the system server. The system server preferably catalogs content data availabilities into program schedules based on the user codes. Preferably, the user codes comprise a set or list of user preferences for each account, wherein user preferences can be submitted to the system server when an account is established on the system server.

A set of user preferences preferably can be modified by an authorized user. User preferences can include, but are not limited to, identified content providers, user likes and dislikes, and preferred times to receive program transmissions. In further embodiments of the instant invention, user preferences are automatically updated based on program transmissions selected through a corresponding account.

Program transmissions are initiated automatically to the user locations according to corresponding program schedules in an account or, alternatively, a user can select a program transmission from an account program schedule.

The system server is preferably in communication with content providers over the system network. The system server surveys content data availabilities and catalogues the content data availabilities into program schedules in accordance with user codes. According to an embodiment of the instant invention, the content data providers automatically send updated program availabilities data to the system server. Alternatively, the system server accesses various content data providers over the system network and extracts data regarding program availabilities.

According to a preferred embodiment of the instant invention, an authorized user may access their account on the system server by a log-in process, whereby the user provides a unique user identification to identify themselves as an authorized the user to the system. Once into the account, the user can preferably modify user preferences and preferably view other account information.

Preferably, the server supports a graphical user interface which allows users to point-and-click on program selections from a program schedule within their account. The selection of a program from the schedule then initiates an on-demand program transmission. According to further embodiments, users may identify a location or locations where program transmissions are to be received. This feature would, for example, allow a user to select a program form work for deliver later at home. A location can be identified by providing a logical address corresponding to a network port or a receiving device.

In the event that the user is not interested in program selections available from their personal program schedule, the system preferably allows the user to browse and select other available programs over the network. Alternatively, or in addition to the above, the user can change their user preferences within the account and search the server data base for other available programs based on these new or modified user preferences.

Program transmissions can be distributed through the system server or distributed from the content provider. The program transmissions can either be immediately played at the user selected locations or, alternatively, are stored on a local storage device for later use.

DETAILED DESCRIPTION OF A PREFERRED EMBODIMENT

The architecture of the instant invention utilizes a server unit coupled to at least one content provider. The server unit provides a central hub for content data distribution. The server unit monitors content data availabilities from the at least one content provider and organizes the content data availabilities into customized program schedules in accordance with user codes.

The user codes preferably provide for a selection of services desired from the at least one content provider. The user codes can also provide for the selection of content data based on information about the intended user, wherein the content data corresponds to scheduled or on demand programs, which may viewed or played at user locations.

Figure 1A:
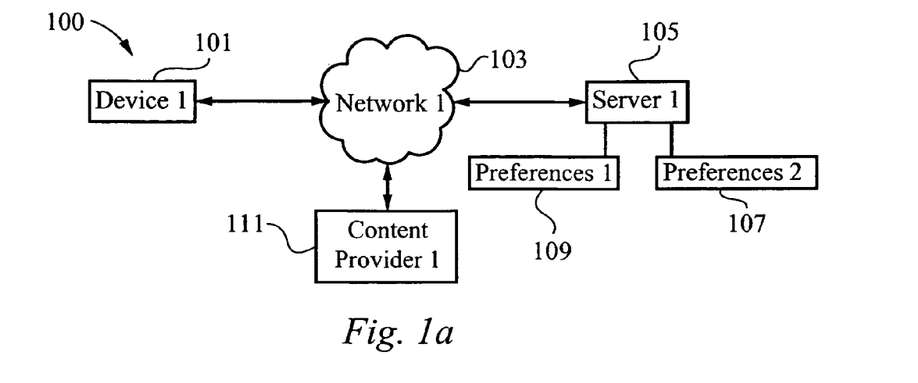
FIGS. 1a-c show several network configurations for distributing content data, in accordance with the current invention.
Figure 1B:
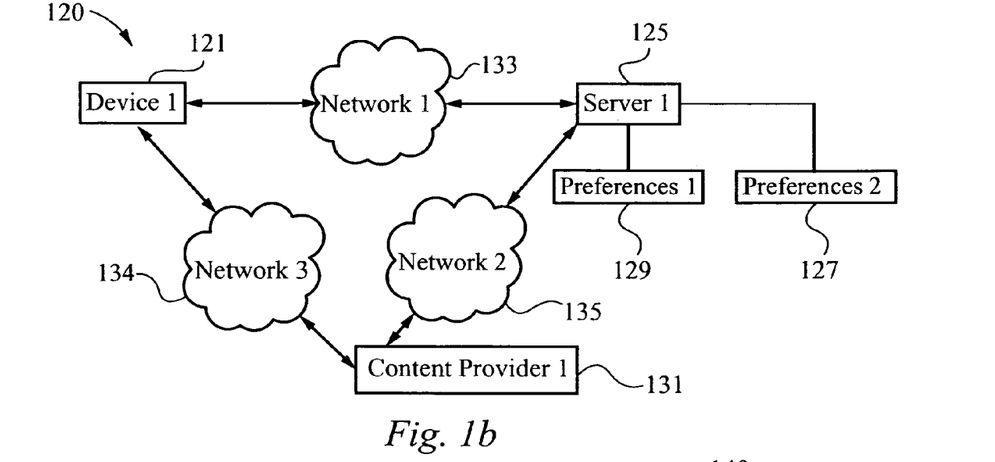
Figure 1C:
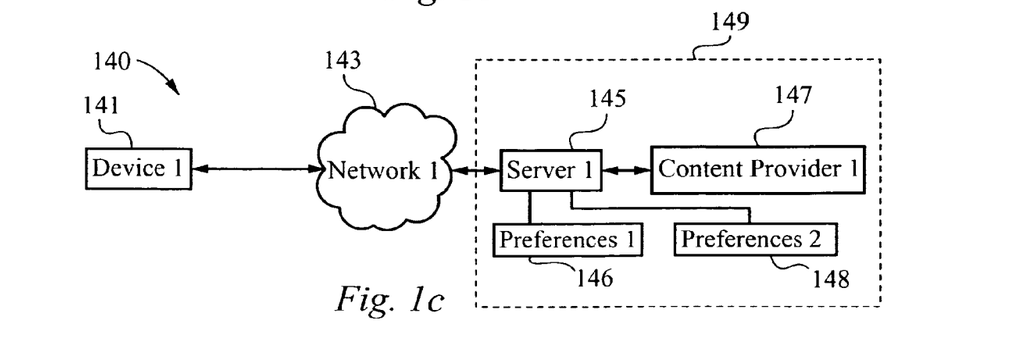

A user preferably can view or access their account and select programs to be transmitted to a predetermined location and/or modify account preferences including, changing content providers and/or services provided therefrom. FIGS. 1a-c will now be used to show several different ways in which a system server may be coupled to content providers for distributing content data to user location, in accordance with the instant invention.

FIG. 1a shows an architecture 100 for distributing content data, in accordance with an embodiment of the invention. The architecture 100 preferably has central network 103. The central network 103 can be either a private or public access network, such as the internet. A system server 105 is coupled to at least one content provider 111 though the network 103. In the architecture 100 shown in FIG. 1, a user can access their account at the server 105 via the network 103 from a device 101, which is also configured to receive program transmissions. Alternatively, the user can access their account at the server 105 from a separate device (not shown). Preferably the user can change preferences 107 and 109 and or select a programs by from their personal account. Preferably, the system server 105 instructs the content provider 111 via the network 103 to route a program transmission to the device 101.

In accordance with one embodiment of the current invention, the system server 105 authorizes and initiates program transmissions to the device 101 by providing the content provider 111 with a logical address of the device 101 or location of the device 101 on the network. Alternatively, the server causes the device 101 to authorize and initiate program transmissions from the provider 111 to the device 101.

According to an alternative embodiment of the instant invention, program transmissions are automatically initiated from the content provider 111 to the device 101 based on preferences 107 and 109 and/or a program schedule without requiring the user to make a program selection.

FIG. 1b show an alternative architecture 120 for distributing content data, in a accordance with the current invention. The architecture 120 has a server 125 that stores preferences 127 and 129 which are used to creates customized program schedules. The architecture 120 has a first network 133, which is preferably a public network, such as the internet, wherein a user can access their account through the public network 133. The system server 125 and a content provider 131 are coupled through a separate network 135 which may be a local area network or other restricted access network. The network 135 is preferably configured to provide the server 125 with content data availabilities from the content data provider 131. The network 134 provide a mechanism for the distribution of program data from the content provider 131 to a receiving device 121. Preferably, the network 133 is a private pay-for-user network.

FIG. 1c show an architecture 140 for distributing content data, in accordance with another alternative embodiment of the current invention. The architecture 140 preferably comprises a server unit 149 coupled to a receiving device 141 through a network 143. The server unit 149 comprises a content source 147 and a system sever 145, wherein the content source 147 provides programs to the device 141 through the system server 145. The system server 145 allocates content data availabilities into program schedules in accordance with stored preferences 146 and 148 and transmits programs automatically, by way of user selections from schedules or a combination thereof.

Figure 2:
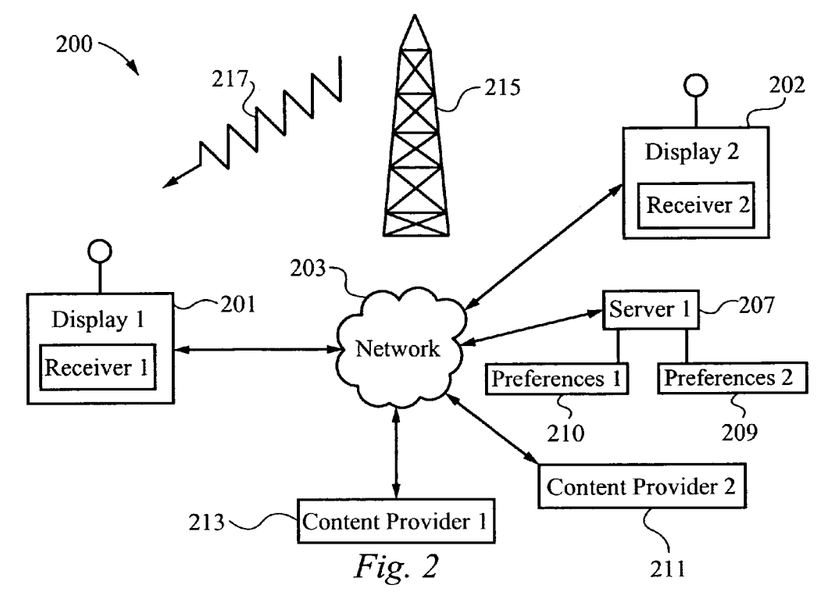
FIG. 2 shows an architecture for distributing content through a network coupled to a plurality of content providers, in accordance with the instant invention.

FIG. 2 shows an architecture 200 for distributing content data to multiple devices 201 and 202 from multiple content providers 211, 213 and 215. The content providers 211 and 213 transmit content data to devices 201 and 202 through a network 203. The network 203 is preferably a private pay-for-use network or, alternatively, is a public network, such as the internet. The devices 201 and 202 preferably have receivers for receiving content data and displays for displaying processed or unprocessed content data received at a user location.

Still referring to FIG. 2, a broadcast content provider 215 broadcasts content data 217, such as television program transmissions or any other kind of broadcast content data. The provider 215 can selectively operate independently of the system server 207 or, alternatively, can be coupled to the server 207, wherein the server 207 provides instructions to the provider 215 to initiate selective broadcasts to one or more of the devices 201 and 202. Accordingly, the server 207 is configured to program the receiver device 201 to receive broadcast data 215 from the content provider 213 according to a schedule. The server 207 preferably stores customized program schedules generated in accordance with user preferences 210 and 209.

Figure 3:
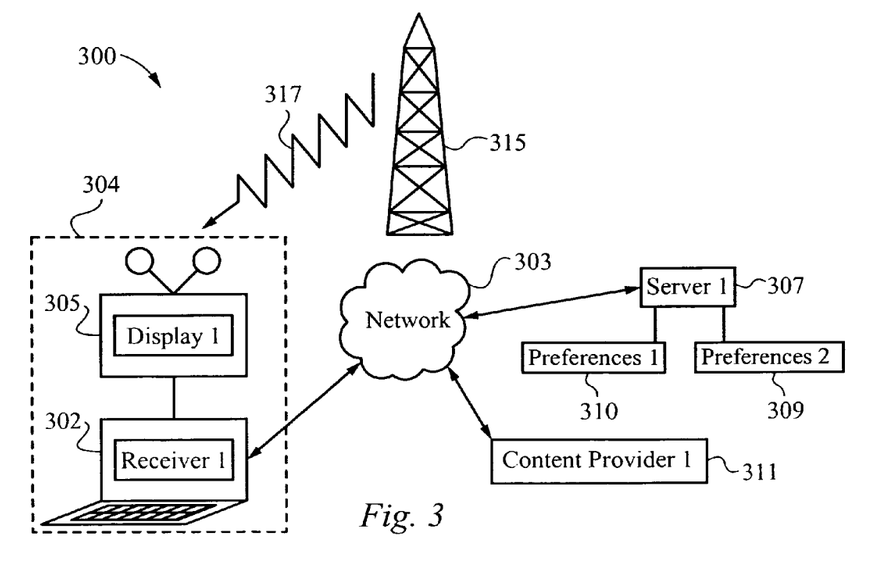
FIG. 3 illustrates a personal computer interfacing a television for receiving and viewing content data over a network, in accordance with a preferred embodiment of the current invention.

FIG. 3 shows an architecture 300 for distributing content data, in accordance with a preferred embodiment of the current invention, wherein the receiver device 304 comprises a personal computer 302 and a television set 305. The personal computer 302 can be coupled to a network 303 and configured to access the server 307 where a program schedules are stored in personal accounts. A content provider 311 is preferably is coupled to the network 303 and configured to transmit program data via the network 303 to the device 304 in accordance with the program schedules. As described previously, program schedules are preferably generated in accordance with user preferences 309 and 310 which are also stored on the server 307.

Figure 4:
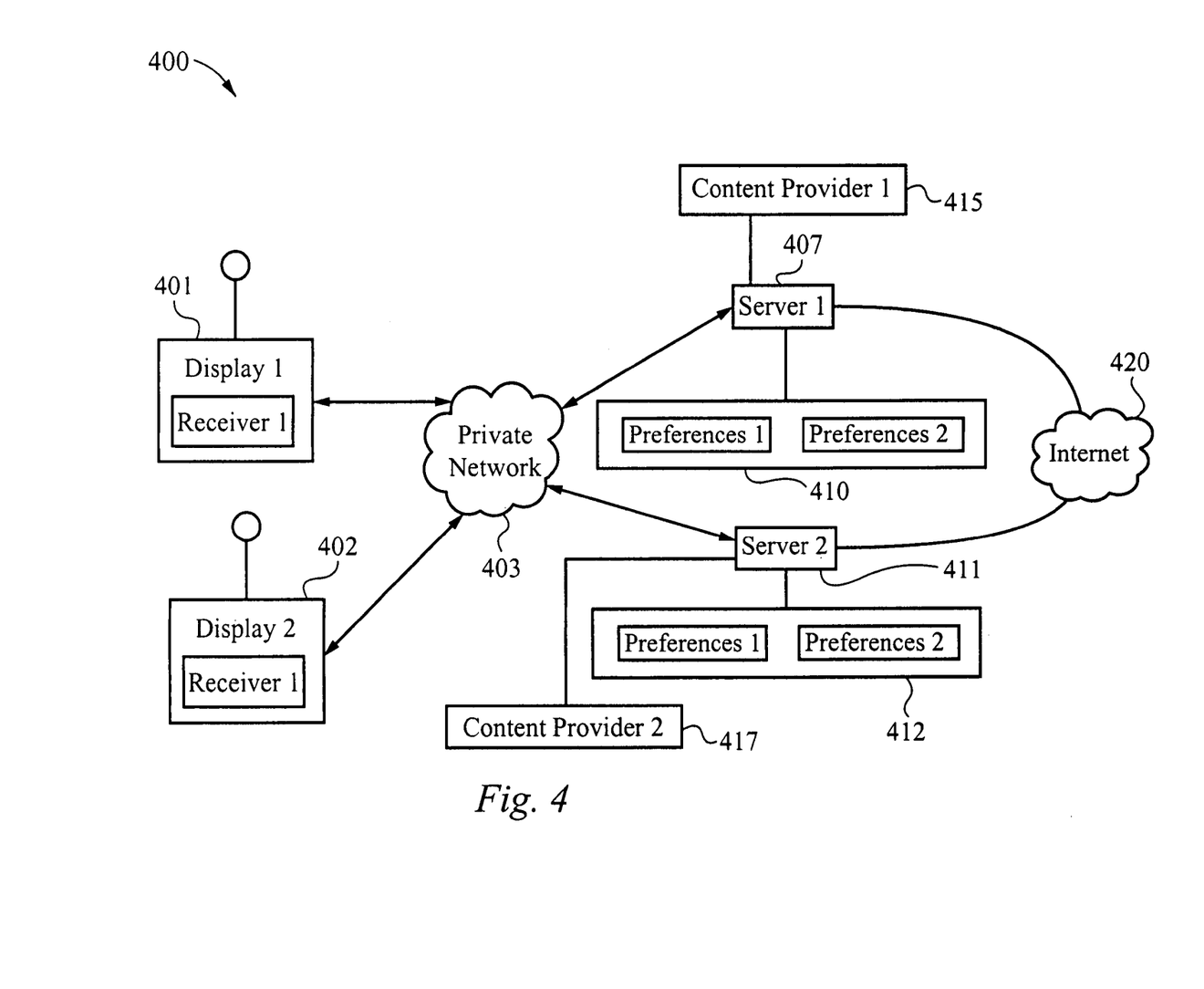
FIG. 4 illustrates an architecture for distributing content data through a private network, in accordance with an alternative embodiment of the current invention.

FIG. 4 shows an architecture 400 for distributing content data, in accordance with an alternative embodiment of the current invention. The architecture 400 can include multiple servers 407 and 411. The architecture 400 preferably includes a network 403 that is preferably a private network for users subscribing to the account at one or more of the servers 407 and 411. Each server 407 and 411 is preferably coupled to content data provider 415 and 417. The servers 407 and 411 monitor availabilities of content data from the content data providers 415 and 417 and compile customized schedule catalogs for each set of user preferences 410 and 412. The devices 401 and 402 preferably have receivers for receiving programs and displays for displaying process program data. A user can access their user account and view their program schedule therein via the internet 420 from one or more of the receiving devices 401 and 402 or, alternatively, from a separate device (not shown). The user can then select which programs are to be transmitted to the receiving devices 410 and 402 and/or modify account information. Preferably, each user account has it own user list of associated preferences and the server store multiple accounts corresponding to multiple user locations.

In an alternative embodiment of the instant invention, program schedules are assigned to or belong to the devices 401 and 402, wherein programs are automatically transmitted to devices and 402 according to the programs schedule assigned to the devices. Accordingly, a user sets up a list of preferences for each device 401 and 402 and program transmissions which are receivable at each of the device 401 and 402 as determined by program schedule generated for each device 401 or 402. Preferably, the servers 407 and 411 are responsible for controlling the authorization of the device 401 and 402 to receive a program transmission from the providers 412 and 415.

Figure 5:
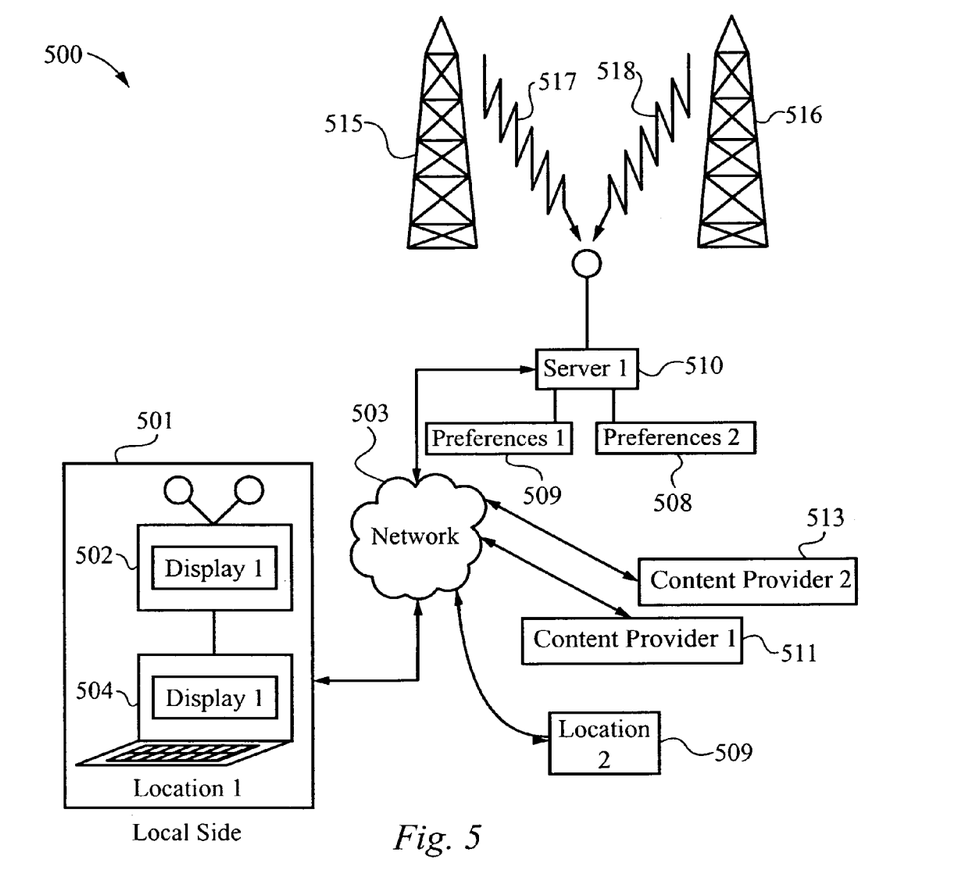
FIG. 5 illustrates an architecture for controlling transmissions of content data from a first location to a second location, in accordance with the current invention.

FIG. 5 shows an alternative architecture 500 for distributing content data, in accordance with the instant invention. In the architecture 500, a server 510 receives broadcast content data 517 and 518 from broadcast content providers 515 and 516. In this way, the sever 510 is an "intermediate content provider" for provisioning content data transmissions 517 and 518 indirectly to a receiving device 501. The distribution of broadcast content data is preferably determined by a program schedule stored on the server 510 which is based on a corresponding list of user or device preferences, as described in detail above.

Still referring to FIG. 5, content providers 511 and 513 are coupled to the network 503 for transmitting programs, to the receiving device 501. The programs are preferably digital video programs. The receiving device 501 preferably comprises a computer 504 and a television 502. Users can access their schedules over the network 503 and modify the preferences 508 and 509 including their choice of which providers 511 and 513 and select programs to be received from each of the providers 511 and 513.

The architecture 500 can provide for the ability to select a second receiving location 509 to receive a program transmission. The second receiving location 509 is preferably coupled to the network 503 and/or is configured to receive broadcast content data from at least one of the providers 511, 513, 515 and 516. When program transmissions are digital video program transmissions, the second location is preferably identified by providing the server 510 with a logical address corresponding to the second receiving location 509.

Figure 6:
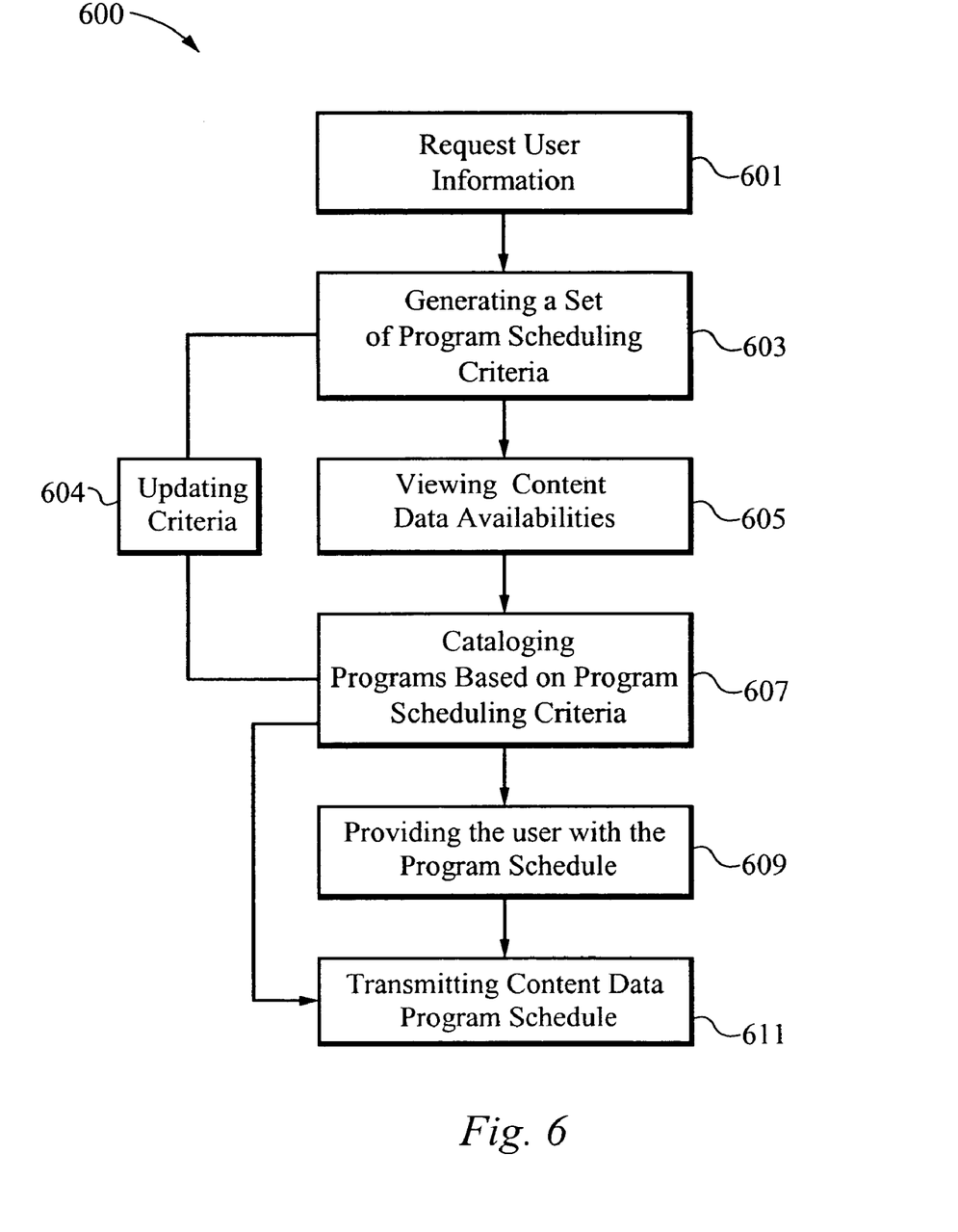
FIG. 6 is a flow-chart outlining the steps for distributing content data, in accordance with a method of the instant invention.

FIG. 6 is a schematic block diagram 600 outlining steps for distributing content data, in accordance with a method of the instant invention. When the user first sets up an account at a the system server in the step 601, there is preferably a request for user information. The request for user information can be made by telephone, e-mail, ground mail, surveys or any other suitable means including unsolicited means. Preferably, users can visit a web site and set up their own account. User information can include, but is not limited to provider selections and service selections. Additionally, user information preferably includes a list of preferences. User preferences can include information such as the type of programs in which the user is interested, the user likes and dislikes and/or preferred times to receive program transmissions. The user preferences may also specify a user locations to receive program transmissions. After the account is established, the system preferably provides the user with an estimate of the cost and a list of the subscribed services and a personal identification number.

In the step 603, a program scheduling criteria is developed. The program scheduling criteria can be any simple or complex algorithm, but preferably includes weighting factors for user preferences acquired in the step 601. For example, in the step 601 a user inputs that their professional interests include healthcare. Thus, programs which deal with healthcare issues may be given high priority in the customized program schedule developed in the step 609. If in the step 601 the user inputs that they do not like sports, then sports programs may be eliminated from the customized program schedule or, alternatively, are give low priority in the customized program schedule developed for that user in the step 609.

After the program scheduling criteria is generated in the step 603, then in step the 605, the server reviews program availabilities for all of the designated content providers. The server can obtain program availabilities automatically from the content provider or, alternatively, extract program availabilities over the network. In yet a further embodiments, the program availabilities can be entered into the server manually. Program availabilities are preferably updated at the server as new programs become available or as program availabilities change. After the program availabilities are compiled at the server in the step 607, the server catalogs the programs into a customized program schedule according to the user criteria.

Customized program schedules are preferably viewable over the system network, wherein the user program schedule is displayed on a display device with a graphical user interface. Further, the customized program schedule can have any of a number or formats. The schedule can display program availabilities corresponding to a day a week, a month or other suitable time frame. Program availabilities can be tabulated, or organized into blocks or categories, such as sports or news. In accordance one embodiment of the instant invention, the user can select and/or modify the schedule format. While it is preferable that customized program schedules are viewable over the system network, the program schedules can be provided to users by any other suitable method including mail and e-mail.

After the customized program schedule is provided to the user in the step 609, then in the step 611 the user can select a program for initiating transmission of a program to the user location. Alternatively, a program is transmitted to the user location without requiring the user to make a selection.

Figure 7:
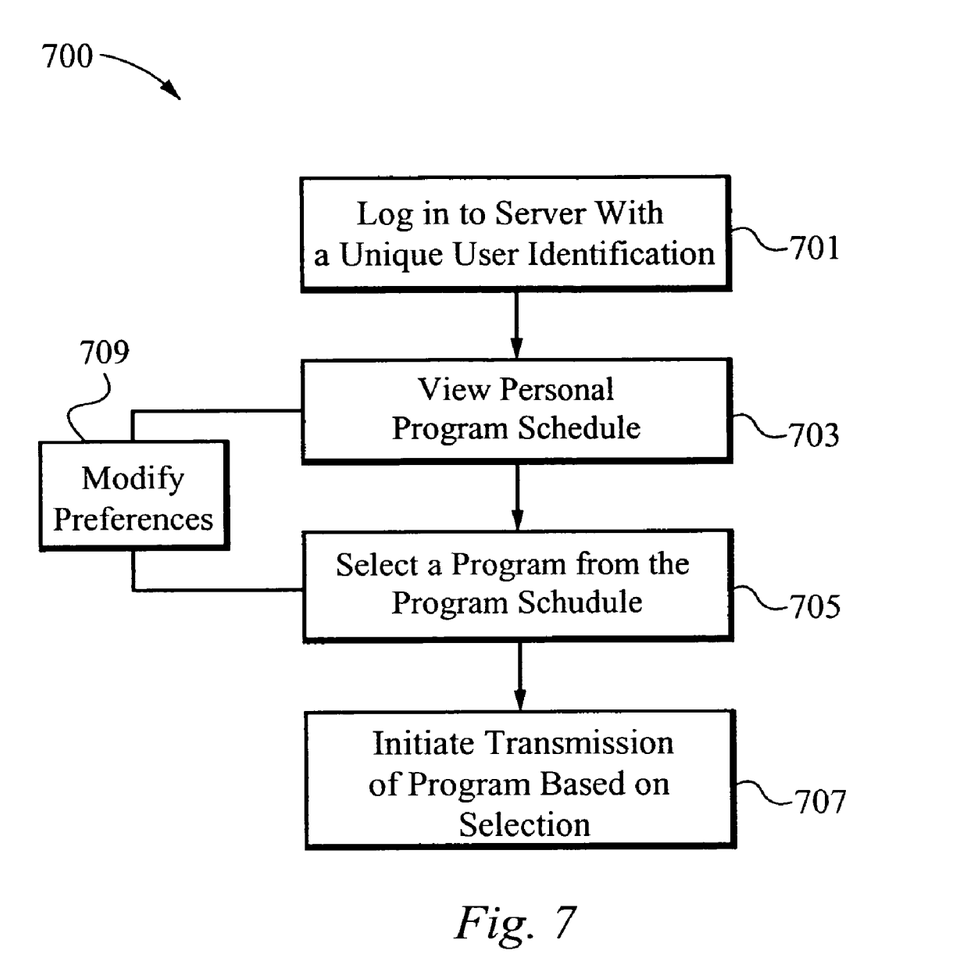
FIG. 7 is a flow-chart outlining the step for selecting a program in accordance with a preferred method of the instant invention.

FIG. 7 shows a flow-chart 700 outlining the step for selecting a program in accordance with the preferred method of the instant invention. In the step 701, a user preferably can log into their personal account by providing a secured user code, such as a user identification number. Then in step 703, the user can view their personal program schedule. In the step 705, the user can select programs from their schedule. Preferably, the program schedule is supported by a graphical user interface which allows the user to point-and-click on a displayed program icon to select a program. After the program is selected in the step 705, then in the step 707 transmission of the program content data to user location is initiated.

After viewing the personal program schedule in the step 703, the user can preferably modify the account and/or user preferences. By refreshing the account, the server re-compiles program availabilities based on the new account information or modified preferences. It is also preferable that the user can search a server data based for alternative programs, which are not displayed in the personal program schedule, using a simple search engine.

After the program is selected in the step 705, then in the step 707 the transmission of the program to the user location is initiated by any number of conventional mechanisms including, but not limited to, initiating a broadcast of a program, decoding a local receiver to receive an encrypted broadcast, transmitting data to a port on a system network or be routed from the server to a receiving device or alternatively can be distributed directed from the content provide which receives authorization for the server to transmit programs to the user location. In accordance with a preferred embodiment of the invention, the system for distributing content data is a pay-per-view system, wherein the user is automatically billed for each program transmission, as described in detail below.

Figure 8A:
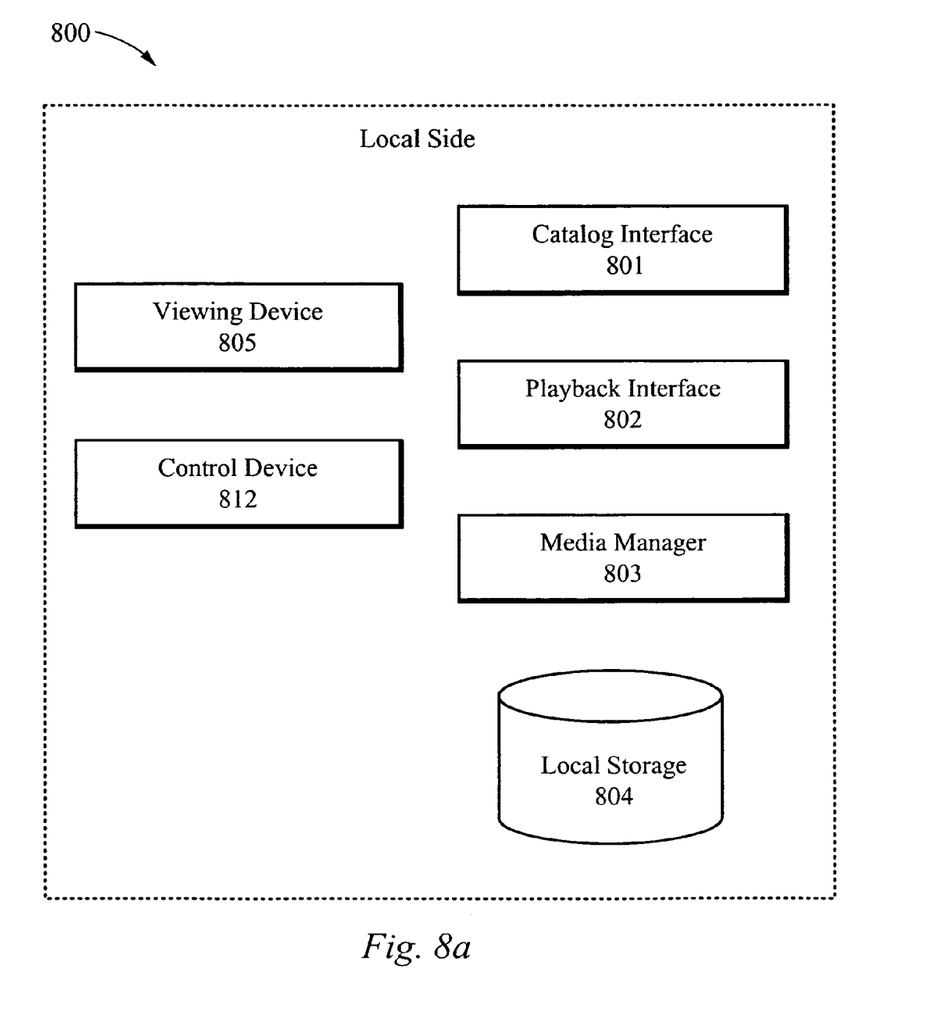
FIGS. 8a-b are schematic diagrams of features on the local side and the server side of a system for distributing content data, in accordance with the current invention.
Figure 8B:
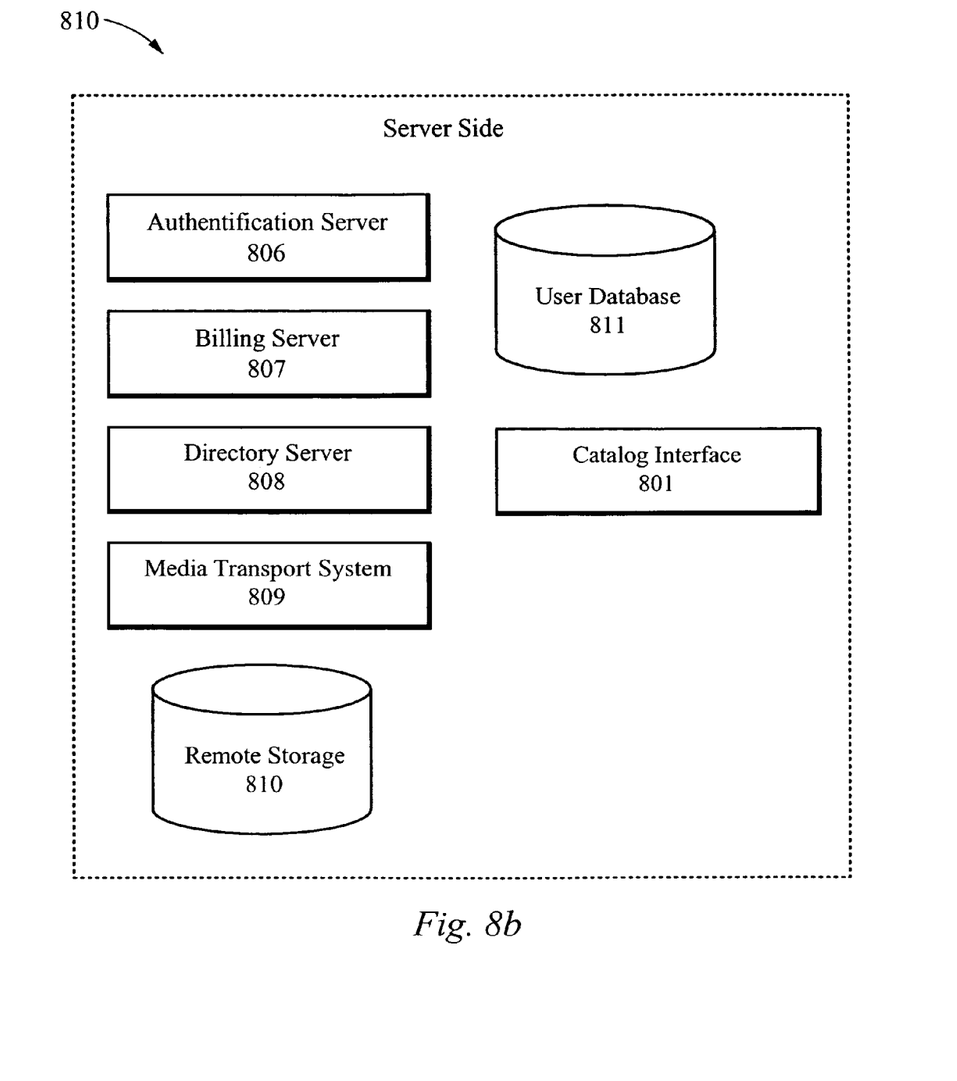

FIGS. 8a-b, shows the elements on the local side 800 and the server side 810 of a system for distributing content data, in accordance with the instant invention. The catalog interface 801 is coupled to an authentication server 806 to verify the identity of the user. The catalog interface 801 is preferably accessible from both the local side 800 and the server side 810 of the system. After the user is identified, then the catalog interface 801 will collect information about the user, preferably including payment information and a credit card number. The catalog interface 801 will then send the information the authentication server 806 which stores the user information in a user data base 811. The catalog interface 801 can also check the payment information with a billing server 807 before validating the user's account.

After the user has established a valid account, the catalog interface 801 will query the directory server 808 for a list of available programs and preferably provided the list of available programs in a menu format to the user through a viewing device 805. The user can select a program choice from the menu through the catalog interface 801 whereby the catalog interface 801 communicates the choice to directory server 808. The directory server 808 then communicates the cost of program to the billing server 807.

If the billing server 807 is unable to bill for the program selection, the billing server 807 will communicate the failure back to the directory server 808, and the directory server 808 will communicate the failure to the catalog interface 801. The catalog interface 801 will then communicate the billing failure to the user and wait for another program selection.

In the event that the billing server 807 successfully bills the user for the program section, then the billing server 807 communicates to the directory serve 808 that the selection has been accepted. The directory server 808 then communicates the selection to media transport system 809 and tells the media transport system 809 to authorized streaming of the content data, which is preferably digital video content data.

After the streaming of video data is authorized by the media transport system 809, then the media transport system 809 allows the directory server 808 to access the video data. The directory server 808 then communicates to the catalog interface 801 that payment was received for the video program and that the video data is now authorized to be transmitted.

To work through fire walls that might exist on the local side 800 of the system, the media manager 803 is preferably coupled to the media transport system 809, such that after the catalog interface 801 informs the user that the program has been paid for and that the video data is ready to be transmitted, the catalog interface 801 sends an authorization confirmation to the media manager 803. The media manager 803 then established a communication channel with the media transport system 809 and communicates a confirmation of the authorization to the media transport system 809 which starts streaming the video data to the media manger 803 from a remote storage device 810. The media manager 803 receives the stream of video data and preferably stores the video data on a local storage device 804. The remote storage device 810 can be a single storage device or any number of storage devices that are accessible over the system network (not shown).

In accordance with an embodiment of the invention the video data is encrypted or otherwise marked with identifying information that relates a copy of the content data to the user account. Further, while components on the local side 800 can reside on the same processor device, preferably the media manager 803 and the local storage device 804 reside on a home server device and the catalog interface 801 and the playback interface 802 reside on a desktop computer.

While the data stream is being downloaded and saved to the local storage device 804, the catalog interface 801 and/or the playback interface 802 can be used to monitor the download progress. Further, at any time after video download is started, the playback interface 802 can be used to play the video data. However, if the download or streaming rates are slower than the payback rate, the entire video may not be available for viewing at any given time.

Preferably the playback interface 802 is used to select a viewing device 804, wherein the playback interface 802 receives input instruction from any suitable control device 812. For example, the viewing device 805 is a monitor on a desktop computer or a television set. The control device 812 may comprise an internet browser, a software application program, an infrared remote controller a cursor controller and/or a key board.

The playback interface 802 preferably queries the media manager 803 for what videos are stored on the local storage device 804 and displays the stored video program to the user through the catalog interface 801.

When a playback is requested by the user through the control device 812, then the playback interface 802 communicates the request to the media manager 803. The media manager 803 then communicates authorization to the media transport system 809 and the media transport system 809 authorizes the playback of the video data.

Alternatively, the playback request can be denied if an authorization time limit has expired or if the user is not authorized to view the selected playback video data. In the event that the playback is authorized, the media transport system 809 can pass encryption keys to the media manager 803 required to playback the video data when the video data is encrypted.

After the media manager 803 streams the video and the user is finished viewing the video program on the viewing device 805, the user can remove the video data from the local storage device 804. Preferably, the user communicates a request to remove the video data from the local storage device 804 through the control device 812. The control device 812 then communicates the request to the playback interface 802. The playback interface 802 tells the media manager 803 to remove the video from the local storage device 804. The media manager 803 then confirms with the playback interface 802 that the video data has been removed from the local storage device 804 and communicates the result to the user through the viewing device 805.

Figure 9:
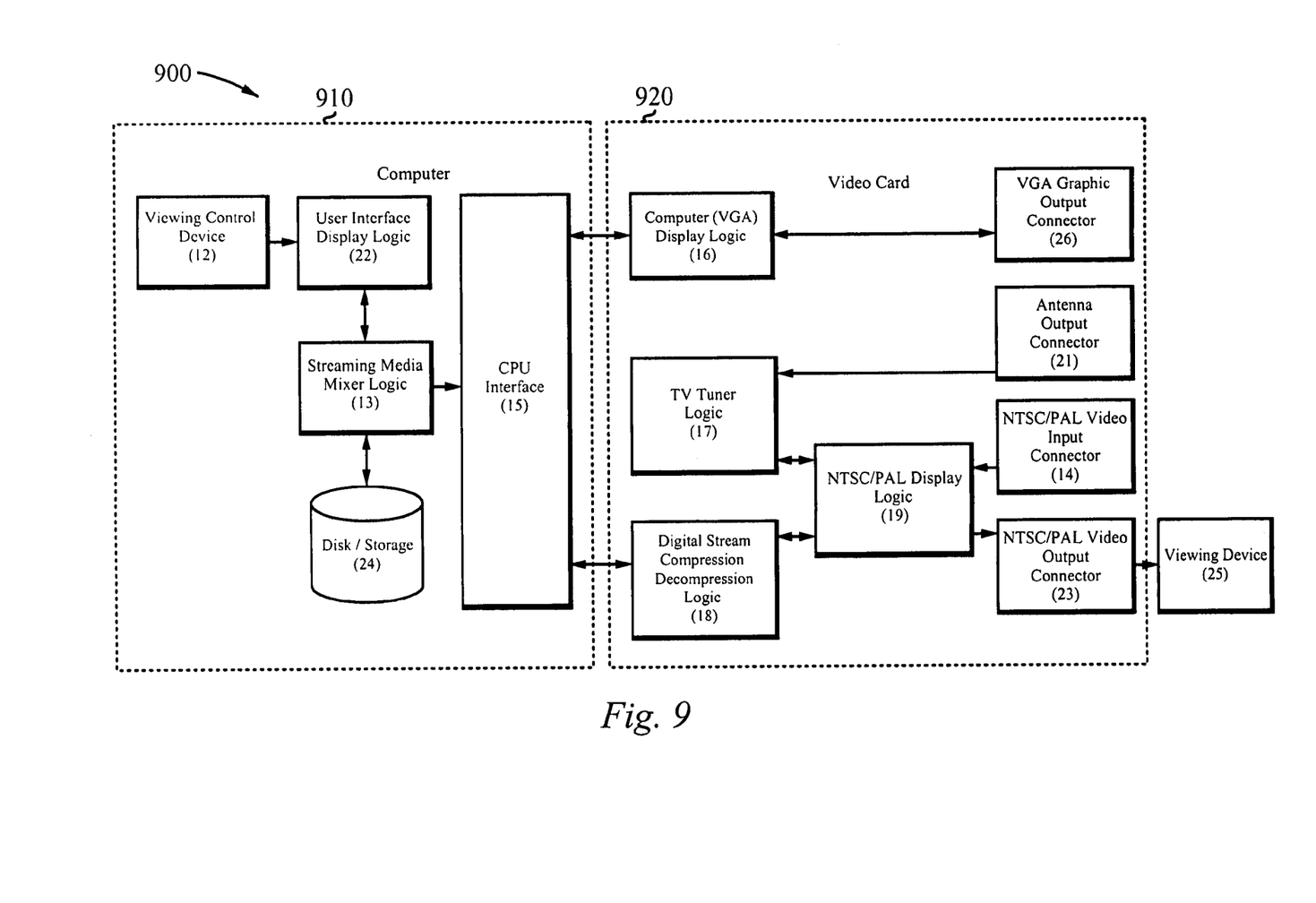
FIG. 9 illustrates a block diagram of computer with a video card for interface in a viewing device, in accordance with the preferred system of the current invention.

FIG. 9 illustrates the preferred local system 900 at a user location for processing video data streams and display processed video data streams at a viewing device 25, in accordance with the instant invention. The system preferably utilizes a computer 910 with a video card 920. The video card 920 preferably has graphical output connector 26 and computer display logic 16 for supporting and display program graphics on a computer monitor. The viewing device 25 is preferably a television set or computer monitor connected to the computer 910 through a video output connector 23. Using a viewing control device 12, such as a key board, a cursor control device (e.g. computer mouse) or an infrared control device, as described above, the user sends a request to the a remote server that he/she wants to watch a video on the viewing device 25. The streaming media mixer logic 13 retrieves the stored data stream stored on the disk storage device 24 and sends the video data to the CPU interface 15. The CPU interface 15 sends the video data to the digital stream compression/decompression logic 18 on the video card 18. The digital stream compression/decompression logic 18 decompresses the video data and, if necessary, sends the video data to the display logic 19 to be converted to a displayable signal. The displayable signal is then sent through the stream media logic mixer 13 to be displayed on the viewing device 25.

When a request is submitted from the control device 12, the display logic 16 creates a graphical display frame in its memory with the appropriate content. The displays frame is sent to the streaming media mixer logic 13. The streaming media mixer logic 13 preferably contains the same compression/decompression algorithms as the digital stream compression/decompression logic 18. Instead of simply forwarding the compressed display frame to the CPU interface, the streaming media mixer logic 13 uses its logic to creates and to decompressed display frame. The streaming media mixer logic 13 then overlays a graphical data frame from the display logic 22 onto the decompresses display frame. The streaming media mixer logic 13 compresses the new combined display frame and sends the combine display frame to the viewing device 25.

For full motion video, the streaming media mixer logic 13 preferably produces the combined display frames at a rate of thirty frames per second or greater. If the computer 910 used does not have sufficient processing capabilities to allow for processing of full motion video, the same display frame is displayed for some multiple number of times and the subsequent intermediate frame(s) are ignored at the CPU interface.

In other cases, the user can watch a direct video program on the viewing device 25, wherein the video data is arriving on the video card from a video input connector 14 or through an antenna input connector 21 from a television tuner logic 17. Accordingly, a user request arrives from the control device 12 and the content data is routed through the display logic 19 and then to the video output connector 23 to be displayed on the viewing device 25. In this example, the computer 910 does not process the video data.

In a third case, a user submits a request from the control device 12 and the interface display logic 22 generates the appropriate graphical display data frame. When graphical display data frame is presented to the streaming media mixer logic 13, the streaming media mixer logic 13 sends a message to the video card 920 through the CPU interface 15. The video card 920 accepts the signal being routed through the display logic 19 and instructs the digital stream compression/decompression logic 18 to digitize and, optionally, compressed graphical display data frame before sending the graphical display data frame to the display logic 19 through the CPU interface 15 to the streaming media mixer logic 13.

The streaming media mixer logic 13 now has the compressed graphical display data frame and uses the same process described above to overlay a graphical display frame from the user interface display logic 22 on to the current display frame and sends the combined display frame through the CPU interface 15 to be decompresses by the digital stream compression/decompression logic 18. The digital stream compression/decompression logic 18, then sends the uncompressed combined display frame to the display logic 19, which outputs signals to the video output connector 23 to be displayed on the viewing device 25.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention.

What is claimed is:

1. A method for distributing a digital video program from at least one content provider to at least one receiver communicatively coupled to a network, said method comprising:
   receiving user preference data comprising user identification information, one or more preferred program types, user billing information, and a device indicator;
   determining a plurality of digital video programs available for transmission over the network;

generating a customized programming schedule comprising program schedule listings for a subset of the digital video programs selected based on the preferred program types and the device indicator;
receiving a remote log-in request to access a user account, said log-in request being received over the Internet via a separate device;
granting access to the user account via the Internet;
selecting the customized programming schedule from a plurality of customized programming schedules based on a determination that the separate device corresponds to the device indicator;
transmitting, to the separate device, display data for displaying the customized programming schedule;
receiving, from the separate device, a selection signal for selecting one of the plurality of digital video programs;
automatically updating the user preference data based on the selected digital video program;
attempting to bill the user account for the selected digital video program using a determined cost associated with the selected digital video program and user billing information; and
routing the selected digital video program to at least one receiver if the user account was successfully billed for the selected digital video program.

2. The method of claim 1, wherein said at least one receiver includes a storage medium, said method further comprising configuring the at least one receiver to record the selected digital video program.

3. The method of claim 1, wherein the at least one receiver is configured to receive the selected digital video program at a designated time, the designated time corresponding to a time when the digital video program is made available by a content provider.

4. The method of claim 1, further comprising:
receiving, from the separate device, a request to browse through additional program schedule listings, wherein each additional program listing is associated with an additional digital video program not included in the subset of the digital video programs; and
transmitting, to the separate device, display data for displaying the additional program schedule listings.

5. The method of claim 1, further comprising routing the selected digital video program from a content provider to at least one additional receiver distinct from the at least one receiver.

6. The method of claim 1, wherein generating a customized programming schedule comprising a subset of the digital video programs selected based on the preferred program types comprises:
determining one or more weighting factors based on the preferred program types.

7. The method of claim 6, wherein generating a customized programming schedule comprising a subset of the digital video programs selected based on the preferred program types further comprises:
determine a priority value for each of the digital video programs based on the weighting factors; and
selecting one or more high priority digital video programs for inclusion in the subset by comparing the priority value of each digital video program with a threshold value.

8. The method of claim 1, further comprising:
generating an updated customized programming schedule based on the updated user preference data, wherein the updated customized programming schedule comprises one or more digital video program not included in the customized programming schedule.

9. A method for distributing a digital video program from at least one content provider to one of a plurality of receivers communicatively coupled to a network, said method comprising:
receiving user preference data comprising user identification information, one or more preferred program types, user billing information associated, and a device indicator;
determining a plurality of digital video programs available for transmission over the network;
generating a customized programming schedule comprising program schedule listings for a subset of the digital video programs selected based on the preferred program types and the device indicator;
receiving a remote log-in request to access a user account, said log-in request being received over the Internet via a separate device;
granting access to the user account via the Internet;
selecting the customized programming schedule from a plurality of customized programming schedules based on a determination that the separate device corresponds to the device indicator;
transmitting, to the separate device, display data for displaying the customized programming schedule;
receiving, from the separate device, a selection signal for selecting one of the plurality of digital video programs;
automatically updating the user preference data based on the selected digital video program;
receiving, from the separate device, a designation signal for designating a primary receiver and a secondary receiver from the plurality of receivers;
attempting to bill the user account for the selected digital video program using a determined cost associated with the selected digital video program and the user billing information; and
routing the selected digital video program to the primary receiver and the secondary receiver if the user was successfully billed for the selected digital video program.

10. The method of claim 9, wherein said secondary receiver includes a storage medium, said method further comprising the step of configuring the secondary receiver to record the selected digital video program.

11. The method of claim 9, wherein the secondary receiver is configured to receive the selected digital video program at a designated time, the designated time corresponding to a time when the digital video program is made available by a content provider.

12. The method of claim 9, further comprising the steps of:
receiving, from the separate device, a request to browse through additional program schedule listings, wherein each additional program listing is associated with an additional digital video program not included in the subset of the digital video programs; and
transmitting, to the separate device, display data for displaying the additional program schedule listings.

13. The method of claim 9, further comprising:
automatically updating the user preference data based on the designation of the primary receiver and secondary receiver.

14. A system for distributing a digital video program to a receiver, said system comprising:
a first receiver communicatively coupled to a network and configurable to receive a plurality of digital video programs from at least one content provider;

a second receiver communicatively coupled to the network and configurable to receive user preference data comprising a user identification information, one or more preferred program types, user billing information, and a device indicator; and a server communicatively coupled to the network, said server comprising:

means for selecting subset of the digital video programs selected based on the preferred program types, means for providing a customized programming schedule in response to receiving the user preference data, said customized programming schedule being associated with the device indicator and listing the subset of digital video programs, means for receiving a remote log-in request to access a user account, said log-in request being received over the Internet via a separate device, means for granting access to the user account via the Internet, means for selecting the customized programming schedule from a plurality of customized programming schedules based on a determination that the separate device corresponds to the device indicator, means for transmitting, to the separate device, display data for displaying the programming schedule, means for receiving, from the separate device, a selection signal for selecting one of the plurality of digital video programs, means for updating the user preference data based on the selection of the one of the plurality of digital video programs, means for billing the user account for the selected digital video program using a determined cost associated with the selected digital video program and the user billing information, and means for routing the selected digital video program to at least one of a first receiver and a second receiver if the user account was successfully billed for the selected digital video program.

15. The system of claim 14, wherein said first receiver includes a storage medium, and wherein said system server further comprises means for configuring the first receiver to record the selected digital video program.

16. The system of claim 15, wherein said means for configuring the first receiver configures the first receiver to receive the selected digital video program at a designated time, the designated time corresponding to a time when the digital video program is made available by a content provider.

17. The system of claim 14, wherein the server further comprises:

means for receiving, from the separate device, a request to browse through listings for a plurality of additional digital video programs not included in the subset of digital video programs, and means for transmitting, to the separate device, display data for displaying a listing of the plurality of additional digital video programs.

18. The system of claim 14, wherein said first receiver and said second receiver are operatively coupled via a private network.

19. A server for distributing a digital video program from at least one content provider to at least one of a plurality of receivers communicatively coupled to a network, said server comprising:

means for determining a plurality of digital video programs available for transmission over the network;

means for providing a customized programming schedule in response to receiving user preference data, said customized programming schedule associated with a device indicator and comprising program schedule listings for a subset of the digital video programs selected based on the user preference data, and said user preference data comprising user identification information, one or more preferred program types, user billing information, and the device indicator;

means for receiving a remote log-in request to access a user account, said log-in request being received over the Internet via a separate device;

means for granting access to the user account via the Internet;

means for selecting the customized programming schedule from a plurality of customized programming schedules based on a determination that the separate device corresponds to the device indicator;

means for transmitting, to the separate device, display data for displaying the customized programming schedule;

means for receiving, from the separate device, a selection signal for selecting one of the plurality of digital video programs;

means for automatically updating the user preference data based on the selection of the digital video program means for determining a cost associated with the digital video program;

means for billing the user account for the digital video program using the determined cost and the user billing information; and means for routing the selected digital video program to at least one of a first receiver and a second receiver if the user account was successfully billed for the selected digital video program.

20. The server of claim 19, wherein said first receiver includes a storage medium, and wherein said system server further comprises means for configuring the first receiver to record the selected digital video program.

21. The server of claim 19, wherein said means for configuring the first receiver configures the first receiver to receive the selected digital video program at a designated time, the designated time corresponding to a time when the digital video program is made available by a content provider.

22. The server of claim 19, further comprising:

means for receiving, from the separate device, a request to browse through additional program schedule listings, wherein each additional program listing is associated with an additional digital video program not included in the subset of the digital video programs, and means for transmitting, to the separate device, display data for displaying the additional program schedule listings.

23. The server of claim 19, further comprising means for routing the selected digital video program from a content provider to the first receiver.

24. The server of claim 19, wherein said first receiver and said second receiver are operatively coupled via a private network.

* * * * *